(12) United States Patent
Colepicolo et al.

(10) Patent No.: US 11,701,206 B2
(45) Date of Patent: Jul. 18, 2023

(54) SYSTEM OF TRIPLE ABUTMENTS WITH TCONNECT

(71) Applicants: Luciana Silva Colepicolo, Belo Horizonte (BR); Maria Auxilia Mourao Martinez, Belo Horizonte (BR)

(72) Inventors: Luciana Silva Colepicolo, Belo Horizonte (BR); Maria Auxilia Mourao Martinez, Belo Horizonte (BR)

(73) Assignee: Vector Yin LTDA, Belo Horizonte (BR)

( * ) Notice: Subject to any disclaimer, the term of this patent is extended or adjusted under 35 U.S.C. 154(b) by 410 days.

(21) Appl. No.: 16/764,065

(22) PCT Filed: Nov. 14, 2017

(86) PCT No.: PCT/BR2017/050343
§ 371 (c)(1),
(2) Date: May 14, 2020

(87) PCT Pub. No.: WO2019/095025
PCT Pub. Date: May 23, 2019

(65) Prior Publication Data
US 2020/0367995 A1    Nov. 26, 2020

(51) Int. Cl.
*A61C 8/00* (2006.01)
(52) U.S. Cl.
CPC ............ *A61C 8/008* (2013.01); *A61C 8/0012* (2013.01); *A61C 8/0069* (2013.01)

(58) Field of Classification Search
CPC ..... A61C 8/008; A61C 8/0012; A61C 8/0069; A61C 8/005; A61C 8/0048; A61C 8/0062;
(Continued)

(56) References Cited

U.S. PATENT DOCUMENTS

2009/0104585 A1* 4/2009 Diangelo ............. A61C 8/0001
433/223

FOREIGN PATENT DOCUMENTS

BR    PI0800298 B1 *  1/2008  ............... A61C 8/00
BR    PI0800298        8/2009
(Continued)

OTHER PUBLICATIONS

Martinez et al., Systema de Pilares Multiples, trigeminados, germinados calcinaveis sobre implantes osseointegrados e guides direcionadores, Republics Federartiva do Brasil, Aug. 25, 2009 (Year: 2009).*
(Continued)

*Primary Examiner* — Ralph A Lewis
*Assistant Examiner* — Mirayda A Aponte
(74) *Attorney, Agent, or Firm* — Remenick PLLC

(57) ABSTRACT

A System of Triple abutments with Tconnect includes T-abutments to place at least three dental crowns over one osseointegrated implant and one T-abutment, for partial fixed cases and new total fixed segmented cases, T-Over abutments with a Plug T for use of overdentures over only one abutment and only one osseointegrated implant, a T-healing for guide specific gingival contour of the Tconnect in the healing phase and T-guides to guide the implant surgery to be positioned for the use of abutments of the system.

26 Claims, 3 Drawing Sheets

(58) Field of Classification Search
CPC ....... A61C 8/0016; A61C 8/0053; A61C 8/00; A61C 8/0071; A61C 8/0068; A61C 8/0077; A61C 8/08; A61C 13/08; A61C 19/00; A61C 19/06
USPC ...................................... 433/172–176, 201.1
See application file for complete search history.

(56) References Cited

FOREIGN PATENT DOCUMENTS

CN 104352284 A * 2/2015 ............... A61C 8/00
WO WO 2007/059595 5/2007

OTHER PUBLICATIONS

Search Report for International Application No. PCT/BR2017/50343 dated May 16, 2018.
Written Opinion for International Application No. PCT/BR2017/50343 dated May 16, 2018.

* cited by examiner

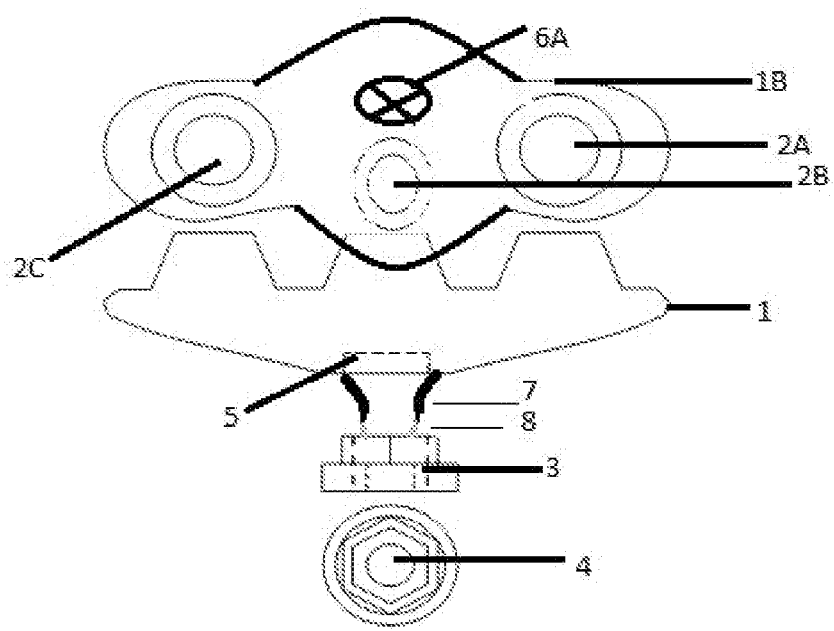
Figure 1
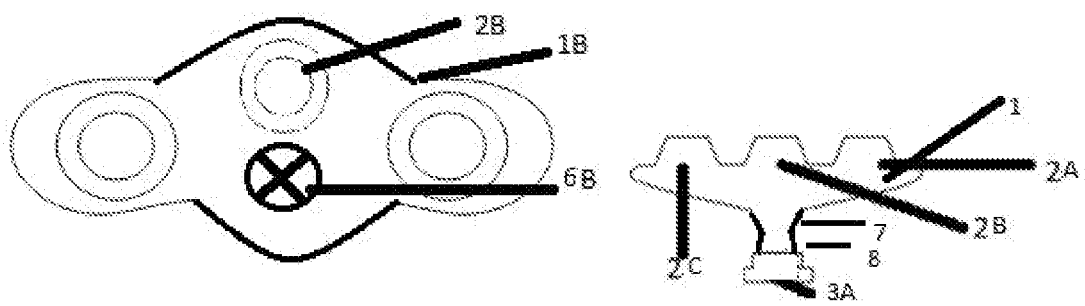
Figure 2
Figure 3

SYSTEM OF TRIPLE ABUTMENTS WITH TCONNECT

REFERENCE TO RELATED APPLICATIONS

The present application is a National Stage Application of Patent Cooperation Treaty Application No. PCT/BR2017/050343, filed Nov. 11, 2017, which is incorporated in its entirety.

TECHNICAL FIELD

The present invention describes the System of Triple abutments with Tconnect, made with an innovative and exclusive design support, present in all the components of the system, with a paraboloid multidimensional contour in a double shape curvature, and three pins, disposed in the form of a tripod arrangement, that promotes optimization of the loading conditions, contributes to longevity of the prosthesis and implant with biomechanical and clinical advantages.

The System of Triple abutments with Tconnect describes T-abutments for partial fixed cases for patients that require placement of at least three dental crowns in areas as small as 16 mm and cannot fit more than one osseointegrated implant and only one abutment in the edentulous area with counter-indication for bone graft.

This system includes correlated use of: T-abutments, for new total segmented fixed rehabilitations too, T-Over and Plug T, for overdentures in patients that require overdentures which can only be supported by one osseointegrated implant and one T-Over; T-healings, with the purpose of modeling the new and specific design of Tconnect in the periimplantary region during the waiting phase; and T-Guides, which are specific guides for implants, to orient the surgical positioning of implant fixation according with prosthetic planning of the System of Triple abutments with Tconnect, and increase the predictability of the final oral rehabilitation.

BACKGROUND ART

Patients with edentulous areas were characterized by severely resorbed bone ridges, inferior bone quality and little bone quantity too. Limitations such as severely resorbed jaws, unfavorable jaw relations due to bone loss and financial restrictions, sometimes prevent the placement of a sufficient number of implants and therefore require an alternative for edentulous patients with compromised oral function.

Solutions are indicated in accordance with each clinical case, for example, in partial areas between 16 mm and 32 mm are performed fixed bridges with welds, but retain difficulty in obtaining the total passivity of the metallic structure, always over two or more implants.

Fixed solutions in the state of the art for total edentulous, with or without addition of bone grafts, are a total fixed denture-protocol type, with metallic bars and cantilevers, or fixed prostheses with welds over several implants, preventing the ideal passivity and longevity of the system.

Overdentures solutions are applied to cases of removable total prosthesis, with at least two parallel implants, bars and attachments. With a lower support area of retention, there occurs difficulty in obtaining the passivity of the prosthesis, lower stability, and fractures or defects are often found. Loss of implants are also described in the literature.

One traumatic factor recognized in total oral rehabilitation with osseointegrated implants in the state of the art is the presence of cantilever extension(s), that increases a lever arm and makes a gradual overload, which may generate tensions concentrated on the cervical implants and marginal resorption, with bone loss in the periimplantary region. Repeated complications are associated with increased mechanical problems in the medium or long term.

Another limitation of the state of the art in total or partial fixed dentures is a decrease in the occlusal vertical dimension and the lack of facial support to the lips, making the bone graft almost obligatory, or the use of acrylic or chromatic flanges to restore this bone loss.

Other aspect encountered in the state of the art is the difficult cleaning dependent accessories do to the limited access and difficulty of handling. Biomechanic problems add to this factor of difficult cleaning, compromising the longevity of the prosthesis and increasing the risk of periimplantites, a local damaging factor that can lead to loss of implants.

In a search for references in patent databases, a technology similar to the invention described herein was found, in Brazilian patent application no. PI0505827-9 and US application publication no. US20080293012 which relate to a geminated Abutment (Splint abutment) for a single implant, but which allows the placement of only two crowns over a single implant. The references discuss limited cases at a distance of edentulous areas of up to 16.0 mm. PI 0505827-9 also does not describe a Tconnect, a T-over or a Plug T.

U.S. Pat. Nos. 6,305,938 and 6,319,000, for example, present a prosthetic bar of protocol-prosthesis type, an integral supporting element including a planar surface substantially perpendicular to the central axis for engagement with a bearing surface on the base supported on various implants. This prosthesis has some limitations, such as the difficulty in cleaning, absence of segmentation and lever arm (cantilever), besides not solving the problem of the partial edentulous areas.

On the other hand, U.S. Pat. No. 4,906,191 proposes a solution for partial edentulous areas, a dental bridge for a dental prosthesis, but with a greater number of implants with precise parallelism and with a predetermined space, to avoid absence of passivity.

The above-mentioned patents do not solve a large number of problems still existing in the state of the art, such as that of patients with little bone availability, with edentulous areas as small as 16.0 mm with room impossible to fit more than one osseointegrated implant in these areas and counter-indication of bone graft.

Today, in relation to traditional systems of overdenture, all forms presented on the market are supported, directed or indiretament by attachments (a ball attachment or magnetic retention systems) and one metallic bar over at least two parallel osseointegrated implants bringing biomechanical disadvantages, with imposition stresses on the attachment parts, from the overdenture to the implants which causes constant exchanges of components and effects the stability of the set, shortening the life of the dental prosthesis and attachment components. Biomechanically, there occurs progressive residual ridge resorption and attachment wear that increases the rotational movements of overdentures during mastication.

For example, U.S. Pat. No. 4,488,875 describes a connector for overdenture through of two parts for stabilizing of a prosthesis in the mouth: one being adapted to be anchored directly or indirectly to the jawbone and the other part being a spherical part or ball adapted to be attached to project therefrom and to enter a socket. In other example, US application publication no. 20100105005 discloses a dental prosthesis implant system having an o-ring retention device according to one embodiment, which causes biomechanics problems.

In brief, the above-mentioned references do not solve a number of problems still existing in the state of the art. The System of Triple abutments with Tconnect unlike the previously described, has a simplified form and better biomechanic enhanced by a TConnect, replaces at least three dental crowns in partial fixed cases or an overdenture in total removable cases over one abutment, ideal for cases when there is an impossibility to fit more than one implant, because the patient has little bone or a counter-indication of bone graft.

SUMMARY OF THE EMBODIMENTS

One embodiment of the invention uses only one implant and one Triple abutment supporting at least three prosthetic crowns, or one T-Over with a Plug T supporting one overdenture with complete passivity. In other words, this new system includes solutions for wider areas, with support for at least three dental crowns or total overdenture over only one osseointegrated implant.

The possibility of the use the T abutments and T Over, with total passivity inserted in place, allows pre-passivity in abutments of the new System, due to absence of welds, bars and cantilevers.

The System of Triple abutments with Tconnect allows for rehabilitation without the need of parallel implants because there is no need for welds or bars between the abutments.

The System of Triple abutments with Tconnect allows for the possibility of corrective angulation in the piece itself or through the use of a Compensatory Corrective Slanted Coping.

The fitting of the prosthetic crowns on the T-abutments of the System and the adaptation of the overdentures of T-Over happen in the contour of the Tconnect, far from the area of connection of the implants, avoiding extravasation of cement to the perimplant region, and avoiding traumatic forces in the implants and connections with consequently loss of implants.

The System of Triple abutments with Tconnect promove T-Over abutment with the advantages of using only one abutment supporting a total superior or inferior removable prosthesis and not requiring parallelism between the implants. The system has a greater area of support of the Tconnect than the area of support of the traditional overdentures (ball type, bar or clip, all of cylindrical socket).

Other differences occur in the adaptation of the overdenture that happen in the contour of the Tconnect, which is different from traditional overdentures, where the fitting and overload occurs on implant connections or attachments, with frictional wear process, this being the cause of many failures in overdentures.

All healings used in the market of implants are of cylindrical profile, as in U.S. Pat. No. 5,336,090, whereas in the System of Triple abutments with Tconnect promote T-healings with the possibility of tissue healing guided by the multidimensional profile of the new design of support from the Tconnect. Thereby modeling post-surgical areas according to Tconnect's non-cylindrical design.

BRIEF DESCRIPTION OF THE DRAWINGS

The foregoing features of embodiments will be more readily understood by reference to the following detailed description, taken with reference to the accompanying drawings, in which:

FIG. 1 is a schematic model of the Triple abutments: (1) is the Triple abutment (1) with the paraboloid multidimensional contour of the Tconnect (1B) in Triple abutment (1) with pins (2A, 2B, 2C) in tripod format, with height ranging from 4.0 mm to 20.0 mm each, over (3) osseointegrated implants; (4) is the connection of osseointegrated implant for a screw; (5) is the bored-through area of 3.0 mm to 18.0 mm for passage of the fixing screw; (7) is the base (girdle) of the T-connect with the narrowing of girdle (8) of 2.0 mm to 10 mm for gingival biological accommodation, this is area in the base of Triple Abutment on the implant platform. The central pin (2B) positioned slightly towards the lingual direction of surgical perforation of implant (6A).

FIG. 2 shows in Superior view (1B) the Tconnect in Triple abutment with central pin (2B) positioned slightly towards the buccal direction in relation other option for surgical perforation of implant (6B).

FIG. 3 shows is a schematic model of the Triple abutment (1) with the pins (2A, 2B, 2C), (3A) is the Tconnect in Triple abutment in compact piece for connection with the osseointegrated implant without a bored-through area (3A), for cases of implants with conical connections, Morse cone type and cold welding.

DETAILED DESCRIPTION OF SPECIFIC EMBODIMENTS

Figure 4:
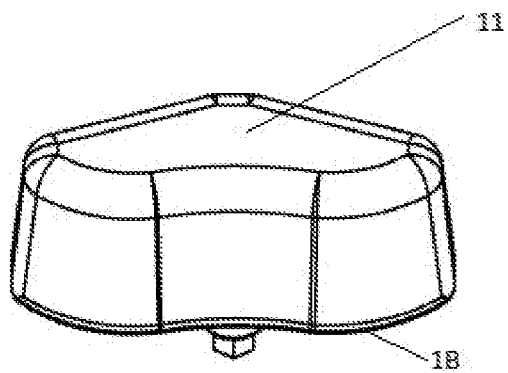
FIG. 4 shows T-healing (11) with T-Connect (1B) having a paraboloid multidimensional contour with a double curvature shape.
Figure 5:
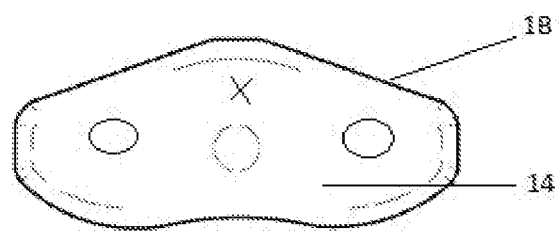
FIG. 5 shows a model of the T-guide (14) with T-Connect (1B) having a paraboloid multidimensional contour with a double curvature shape to guide the perforation of the implant in accordance with the idealized prosthetic planning.
Figure 6:
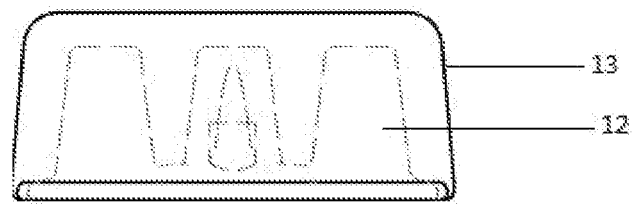
FIG. 6 shows (13) Plug-T with T-Over (12) internally.
Figure 7:
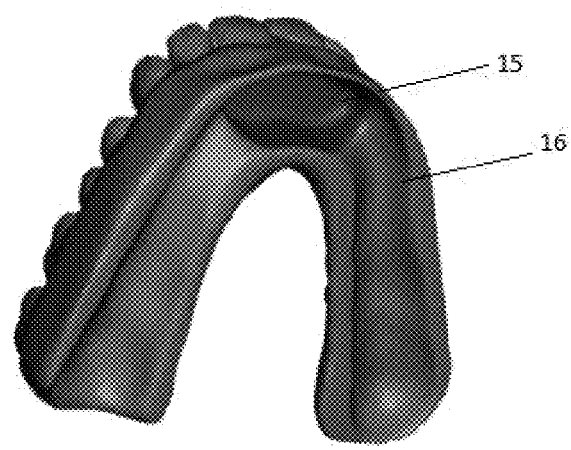
FIG. 7 shows a schematic view of a model of the area (15) for settlement of Plug T of abutment T-Over in (16) prosthesis overdenture type.
Figure 8:
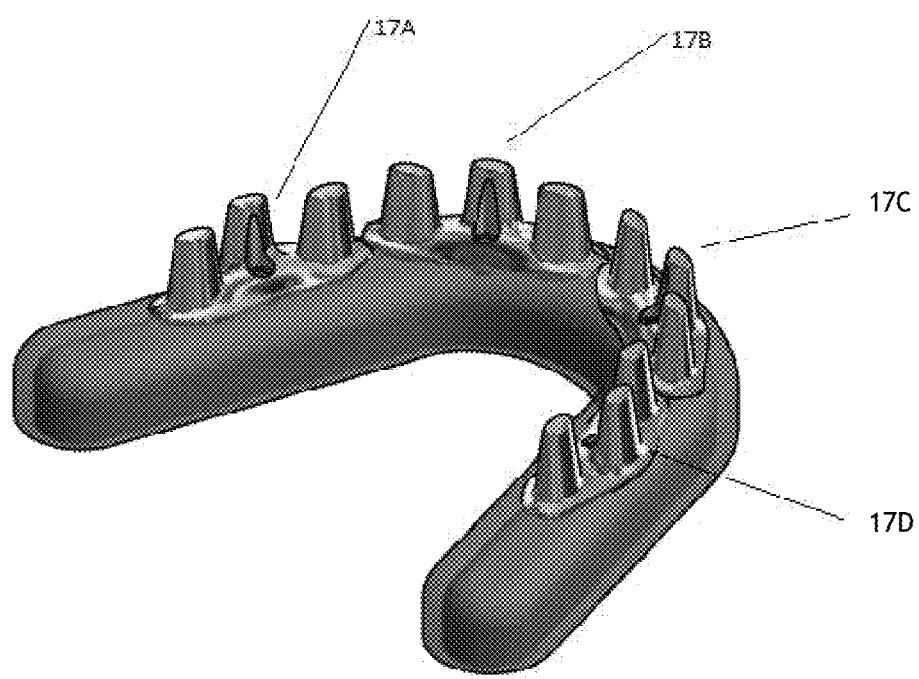
FIG. 8 shows a schematic view of new fixed total segmented arrangement supported (17A), (17B), (17C), (17D) by only 4 implants and 4 types of T-abutments per arcade, with T-connect (1B) with total passivity and absence of welds and bars.

The invention described herein, a System of Triple abutments with Tconnect contains: T-abutments, T-Over abutments and a Plug T, T-healings and T-guides. All components with the Tconnect support a multidimensional contour and paraboloid shape in a double curvature and with three pins, with height ranging from 3.0 mm to 20.0 mm each, rounded, tapered, square, or rectangular shape, expulsive for the occlusal, disposed in the form of a tripod arrangement (in triangular arrangement) over only one implant. The central pin should be positioned slightly towards the vestibula (buccal direction) or lingual direction with respect to the others, in tripod format, and the central region is coincident with an implant fixation area with small variations of positioning, compensated in angulations in the T-Abutment itself. These pins can be subdivided or not, interconnected or not, with space between the two pins ranging from 2.1 mm to 10.0 mm, for patients that require placement of at least three dental crowns and cannot fit more than one osseointegrated implant and only one abutment in edentulous area with a counter-indication for bone graft and also for patients that require overdentures which can only be supported by one implant for the same reason. Another great advantage and option is the fixed total segmented arrangement, without bars, welds and cantilevers promotes the prepassivity of the system and decreases various laboratory stages and costs, because of the promotion of pre-passivity in all types of abutments of the System.

These pins and the Tconnect can be coupled or dismembered in parts and all the components of the System of Triple abutments with Tconnect can be produced in prefabricated form, designed and customized, including in CADCAM-software format.

The Tconnect, by means of this design, with a paraboloid shape contour, provides a positive vertical shield and lateral stability to limit the applied forces, allows a better distribution of forces on the prosthesis before reaching the implant, which is a fundamental advantage to provide diffusion of the immediate load and use of an only one osseointegrated implant for each abutment of the system.

The System allows for the diffusion of the immediate load to avoid migration of soft tissues, which is constant in abutment disconnections, and is traumatic in prosthetic procedures and harmful to the healing of the soft tissue. This promotes biological and aesthetic predictability to the system and proper healing in less time.

The Tconnect presents greater resistance because of the double curvature design, where tension and compression loads are canceled out, and, as a result, the load is transferred to the support edges with intensity of tensions better distributed in all abutments of system, allowing the use of the one abutment and only one osseointegrated implant. The Tconnect has excellent physical properties, which enables all the components of the System to be produced with less material, in membrane or rind type, having less weight and at lower costs.

The System of Triple abutments with Tconnect innovates in the simplification of the surgical and prosthetic processes, avoiding large and highly invasive bone grafts, because the TConnect support fills the space lost by bone resorption and re-establishes the maxillo-mandibular relation in the transversal and sagittal dimensions comprising adequate facial height, without using acrylic flanges and also without reworking the lip support.

The System of Triple abutments with Tconnect are indicated for partial fixed cases with adaptation at least of the three prosthetic crowns in each T-abutment in areas at least from 16 mm, and only one implant or total fixed cases with new segmented arrangement not using bars, welds or cantilevers, and removable total prosthetic reconstruction, type overdenture with T-over and Plug T, all with Tconnect and passivity inserted in all abutments.

In cases of total fixed rehabilitation the System allows for an innovative form of fixed total segmented arrangement through the use of only four fixed T-abutments in each arch, with numerous advantages over the traditional total format (protocol type) since it allows the exchange of its components separately, and in the case of any wear of pieces, without others having to be modified, without affecting the prosthetic set.

Other advantage of the prosthetic segmentation, allows the better distribution of masticatory forces as in the natural dentition, where work and balance forces occur, acting at differentiated points and moments and not on a single rod, at the same moment, bringing forces with overload for mandibular temporal articulation and all components of the system.

Another advantage of the fixed total segmented arrangement is the possibility of easy hygiene without prophylactic accessories, which does not happen in the conventional total prosthesis, in the state of the art, and is one of its major drawbacks, with loss of implants due to the perimplantites due to the hygiene difficulty.

In the traditional form, for edentulous total with type overdenture, are made at least two implants. With T-over Abutments, overdentures can be supported by just one only implant, due to biomechanical advantages presented by new support Tconnect, larger in its dimensions than in Triple Abutment, and with easier implementation of procedures in relation of traditional systems of overdenture, with pre-fitting of the prosthesis with prepassivity already defined by the contour of the T-Over abutment and Plug T, with the advantage of the area of support is greater than the area of support of the traditional overdentures, to compensate local bone loss and for precision settlement of overdenture. not requiring parallelism between the implants, which improves the surgical conditions and reduce the cost of treatment, allowing a greater number of people to benefit from treatment.

Other differences in these systems occur in the adaptation of the overdenture happen in contour of the Tconnect, which is different from traditional overdentures, where the fitting and overload occurs on implant connections or attachments, with frictional wear process being the cause of many failures in overdentures.

The Plug T (plug-type) is the adjustable dispositive piece which makes the precise coupling between the prefabricated prosthesis in the T-Over abutment. The coupling of the Plug T in the Tconnect of the T-Over Abutment can be male-female type, button, pressure, magnet, or other. The Plug T guarantees pre-fitting of the prosthesis with prepassivity, decreasing various laboratory stages in relation to the state of the art and guaranteeing longevity to the system.

The adaptation of the Plug T occurs internally in the area of the overdenture prosthesis through the use of drills and acrylic rebasing or resin for internal coupling. The final prosthesis type overdenture can be pre-contoured or can be modeled after the T-over abutment and Plug T are installed or customized in CAD-CAM service-software or a similar system, allowing a better accuracy of the system.

The Tconnect of T-Over Abutment, is larger in its dimensions than in T-Abutment and the area of support of the Tconnect is greater too, to compensate for local bone loss and for precision settlement of overdenture with full precision adjustment and receiving the efforts of the masticatory loads, slowing efforts to implants and connections.

Through the Plug T and the Tconnect in T-Over, a safe anchorage to the overdentures occurs and without friction in the docking area between implant and connection, as in traditional overdentures. Since the full force is distributed throughout the area of Tconnect, and the prosthesis fitting is delimited away from the area of connection of implant. These characteristics promote the longevity of the system, avoiding constant problems, common in the state of the art, such as: changes of screws and breaks, loss of implants, increased reabsorption of remaining bone tissue, lesions due to lack of retention and stability, inducing masticatory deficiency (grinding of food) leading to failure in the restoration of the individual's quality of life.

The System of Triple abutments promotes T-healings being screwed or pressure, or another fitting plug type, with digital marks for sensorial comfort used to characterize the paraboloid shape contour of the Tconnect during the hold phase of gingival healing, modeling the new design of System in the periimplantary region during the waiting phase, avoiding reopenings and new surgeries in cases of clinical difficulty in choosing an ideal previous abutment or when there is not a condition to use the immediate load.

The System of Triple abutments also promotes T-guides, a guide to surgical perforation, which should be in accordance with the idealized prosthetic planning, for guiding the perforation of the implants and pre-definition of abutments chosen, increasing the predictability of the final oral rehabilitation.

The T-guides will orient the planning and setting of the implant in partial or total edentulous areas in accordance with the treatment planning and will facilitate the surgical performance since they have the same dimensions of the Triple abutment described.

In the case of angled implants, the System of Triple abutments with Tconnect, has the inclination of compensation of the piece itself, in the design of the Tconnect that can be a customized or personalized type project for individualization of parts, with variation between 10° and 30° from the implant insertion axis.

All the components of the System are adaptable to all types of implant/abutment connections on the market, whether internal or external connections, hybrid connections, compensatory slant corrective, converters and extenders or adapted in any other interface of the market and can be manufactured from titanium, carbon, gold, chromium-cobalt, tillite, niobium, zirconia, alumina, ceramic, resin, customized material, be designed or individualized process in type CAD-CAM or similar, and can receive surface treatment.

All the components of the System can be produced with less material, in membrane or rind type, having less weight, lower costs, ensured by the physical properties of hyperbolic paraboloid shape contour presented of the Tconnect.

The biggest advantages of structures type rind or membrane are they are sufficiently thin so as not to develop flexing stresses, but thick enough to resist tensile load, shear and compression forces, that guarantees predictability to the system as well as comfort and safety to the patient.

The Tconnect provides positive vertical shield and lateral stability and allows a better distribution of forces on the prosthesis exhibiting favorable biomechanical properties and pre-passivity acquired in abutments of the System, without welds, for use of the immediate load and of only one implant for each abutment of the system.

T-abutments and T-Over have adjustable height of 1.0 mm-20.0 mm, the buccal-lingual distance varying from 8.0 mm to 20.0 mm is the mesio-distal distance varying from 16.0 mm to 40 mm.

All the abutments of the system have bored-through areas of 3.0 mm to 18.0 mm for passage of the fixing screw or are compact, that is, without bored-through areas in the implant/abutment connection, for cases of conical connections, without screws, as in Morse cone type and cold welding.

All the abutments of the system has in the base of the T-connect one girdle of 2.0 mm to 10 mm with one narrowing in the perimeter of the girdle of 0.7 mm to 6.0 mm for gingival biological accommodation on the implant platform.

The invention imparts better passivity by eliminating the steps of fusing, molding and welding points, facilitating the operating and clinical and laboratory techniques, superior biomechanics properties, predictability and reduction of the clinical time, ensuring longevity of the results.

The invention claimed is:

1. An osseointegrated prosthetic implant system, comprising:
    a single implant adapted to be implanted into a jaw of a patient;
    a triple abutment having three pins in a tripod formation, each pin adapted to receive a dental crown;
    a connector coupling the triple abutment to the implant;
    a T-healing adapted to be placed over the triple abutment during a healing phase of the implantation;
    a T-guide adapted to guide the surgical positioning of the implant, wherein the T-guide has the same dimensions as the abutment in a plane placed over the surgical area;
    a T-plug having an internal T-over adapted to be placed over the triple abutment during use of overdentures; and
    a T-connect adapted to couple the triple abutment to each of the T-healing, the T-guide, and the T-plug.

2. The system of claim 1, wherein components of the system are made from at least one of titanium, carbon, gold, chromium-cobalt, tillite, niobium, zirconia, alumina, ceramic, resin, or calcinable material, and/or the components of the system are adapted for use in at least one of internal or external connections, hybrid connections, compensatory slant corrective devices, converters and extenders.

3. The system of claim 1, wherein components of the system are at least one of prefabricated, customized, and surface treated.

4. The system of claim 1, wherein the T-connect provides a positive vertical shield, lateral stability, and distributes forces on the implant.

5. The system of claim 1, wherein the triple abutment has a paraboloid multidimensional contour with a double shape curvature.

6. The system of claim 1, wherein the T-connect supports at least one of fills space lost by bone resorption and re-establishes maxillo-mandibular relation in transversal and sagittal dimensions and provides adequate facial height, without using acrylic flanges or reworking lip support.

7. The system of claim 1 wherein the system has no welds, bars, or cantilevers.

8. The system of claim 1, wherein components of the system are made in a membrane-like format or rind type format, and are sufficiently thin so as not to develop flexing stresses, but thick enough to resist tensile, shear, and compression loads.

9. The system of claim 1, wherein the triple abutment is adapted to be coupled and/or dismembered in parts.

10. The system of claim 1, wherein each pin is at least one of rounded, tapered, square, or rectangular in shape, expulsive for the occlusal, has a height ranging from 3.0 mm to 20.0 mm, and space between two of the pins ranges from 2.1 mm to 10.0 mm.

11. The system of claim 1, wherein the T-connect is at least one of subdivided or undivided, interconnected or unconnected, has a central region coincident with an implant insertion area, allows for small variations of positioning, and allows for compensation in angulations of the triple abutment.

12. The system of claim 11, wherein the T-connect has an inclination of compensation between 10° and 30° with an implant insertion axis, or has corrective angulation through the use of a compensatory corrective slanted coping.

13. The system of claim 1, wherein the connector is a screw positioned within a hole in the T-connect, the hole having a diameter of 3.0 mm to 18.0 mm.

14. The system of claim 1, wherein the connector is one of a Morse cone or cold welding.

15. The system of claim 1, wherein the T-connect has a girdle of 2.0 mm to 10.0 mm in diameter and narrows to a diameter of 0.7 mm to 6.0 mm for gingival biological accommodation at an implant platform.

16. The system of claim 1, wherein the system allows for cleaning with dental floss and without prophylactic accessories.

17. The system of claim 1, wherein the triple abutment is adapted to provide three crowns within at least a 16 mm space.

18. The system of claim 1, wherein the T-plug is a removable prosthesis type overdenture and does not require parallelism between implants.

19. The system of claim 1, wherein four implanted systems provide a full replacement of a set of teeth without requiring parallelism between the implants.

20. The system of claim 19, wherein components of one system can be replaced without replacing components of another system.

21. The system of claim 1, wherein the T-over has a height of 1.0 mm-20.0 mm, a buccal-lingual distance varying from 8.0 mm-20.0 mm, and a mesiodital distance varying from 16.0 mm to 40.0 mm.

22. The system of claim 1, wherein the T-over is positioned so that cement used in the implant does not touch a perimplant region.

23. The system of claim 1, wherein the size and position of the T-plug and T-over compensates for local bone loss and allows for precision settlement of the overdenture.

24. The system of claim 1, wherein the coupling between the T-connect, the T-over and the overdenture is one of a male-female connection, a button, a pressure connection, or a magnet.

25. The system of claim 1, wherein the overdenture is customized to fit the T-plug.

26. The system of claim 1, wherein the T-healing is coupled to the T-connect with screws, pressure, or a plug fitting.

* * * * *